US007219157B2

(12) United States Patent
Blott et al.

(10) Patent No.: US 7,219,157 B2
(45) Date of Patent: May 15, 2007

(54) APPLICATION PROGRAMMING INTERFACE FOR NETWORK APPLICATIONS

(75) Inventors: Stephen M. Blott, Gillette, NJ (US); Jose' Carlos Brustoloni, Westfield, NJ (US); Clifford E. Martin, Martinsville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 909 days.

(21) Appl. No.: 09/815,942

(22) Filed: Mar. 23, 2001

(65) Prior Publication Data

US 2002/0138664 A1 Sep. 26, 2002

(51) Int. Cl.
*G06F 15/173* (2006.01)

(52) U.S. Cl. .................. 709/238; 709/244; 719/314; 719/328

(58) Field of Classification Search .............. 707/1–10, 707/100–104; 395/650, 200, 120; 709/230–246, 709/203–217; 711/110, 11; 719/311–314, 719/328
See application file for complete search history.

(56) References Cited

U.S. PATENT DOCUMENTS 5,491,800 A * 2/1996 Goldsmith et al. ......... 709/221
6,064,805 A * 5/2000 McCrory et al. ........... 709/227
6,145,061 A * 11/2000 Garcia et al. ............... 711/154
6,282,581 B1 * 8/2001 Moore et al. ............... 709/316
6,546,413 B1 * 4/2003 Northrup .................... 709/200
6,675,218 B1 * 1/2004 Mahler et al. .............. 709/230

OTHER PUBLICATIONS

Blott et al., "NetTap: An Efficient and Reliable PC-Based Platform for Network Programming," published Mar. 26, 2000 in the Institute of Electrical and Electronic Engineers Proceedings of OPENARCH '2000.
Blumrich et al., Virtual Memory Mapped Network Interface for the SHRIMP Multicomputer, In Proceedings of the 21st Annual International Symposium on Computer Architecture, Apr. 1994, pp. 142-153.
Welsh et al., ATM and Fast Ethernet Network Interfaces for User-level Communication. 1997 IEEE, Published in Proceedings of the Third International Symposium on High Performance Computer Architecture, Feb. 1-5, 1997 in San Antonio, Texas, USA.
Druschel et al., Experiences with a High-Speed Network Adaptor: A Software Perspective. In Proc. of SIGCOMM-94, pp. 2-13, Aug. 1994.
von Eicken et al., U-Net: A User-Level Network Interface for Parallel and Distributed Computing, In SIGOPS '95, pp. 40-53, Dec. 1995 CO., USA.
G. Lehey, The Complete FreeBSD, Walnut Creek CD ROM Books (2d ed. 1997).
McKusick et al., the Design and Implementation of the 4.4 BSD Operating System, Addison-Wesley (1996).

* cited by examiner

*Primary Examiner*—Nathan J. Flynn
*Assistant Examiner*—Mohammad Siddiqi

(57) ABSTRACT

An application programming interface (API) is described that allows creating or destroying one or more pairs of data structures for asynchronously passing between the operating system and a network application pointers to packet buffers mapped to both parties.

20 Claims, 7 Drawing Sheets

202:
```
#define CQ_LENGTH 268  /* Power of 2 */
struct cq {
    int head;
    int tail;
    void *(*cqa)[CQ_LENGTH];
};
```

204:
```
static __inline int cq_enqueue(struct cq *cqp, void *p) {
    int t, nt;
    if (cqp->head ==
        (nt = (((t = cqp->tail) + 1) & (CQ_LENGTH - 1)))) {
        return 0;   /* Queue is full */
    } else {
        (*cqp->cqa)[t] = p;
        cqp->tail = nt;
        return 1;
    }
}
```

206:
```
static __inline void *cq_dequeue(struct cq *cqp) {
    int h;
    void *p;

if ((h = cqp->head) == cqp->tail) {
        return 0;   /* Queue is empty */
    } else {
        p = (*cqp->cqa)[h];
        cqp->head = ((h + 1) & (CQ_LENGTH - 1));
        return p;
    }
}
```

208:
```
extern int mbuf_map(struct cq **mbuf_alloc.
            struct cq **mbuf_dealloc, int mbuf_prealloc);
```

210:
```
extern int mbuf_unmap();
```

212:
```
extern int mbuf_pull(int nbufs, int timeout);
```

214:
```
extern int mbuf_push(int tap_descriptor, int nbufs);
```

216:
```
extern int interface_tap(char *ifname,
            struct cq **detour, struct cq **revert, int mode);
```

218:
```
extern int interface_untap(int tap_descriptor);
```

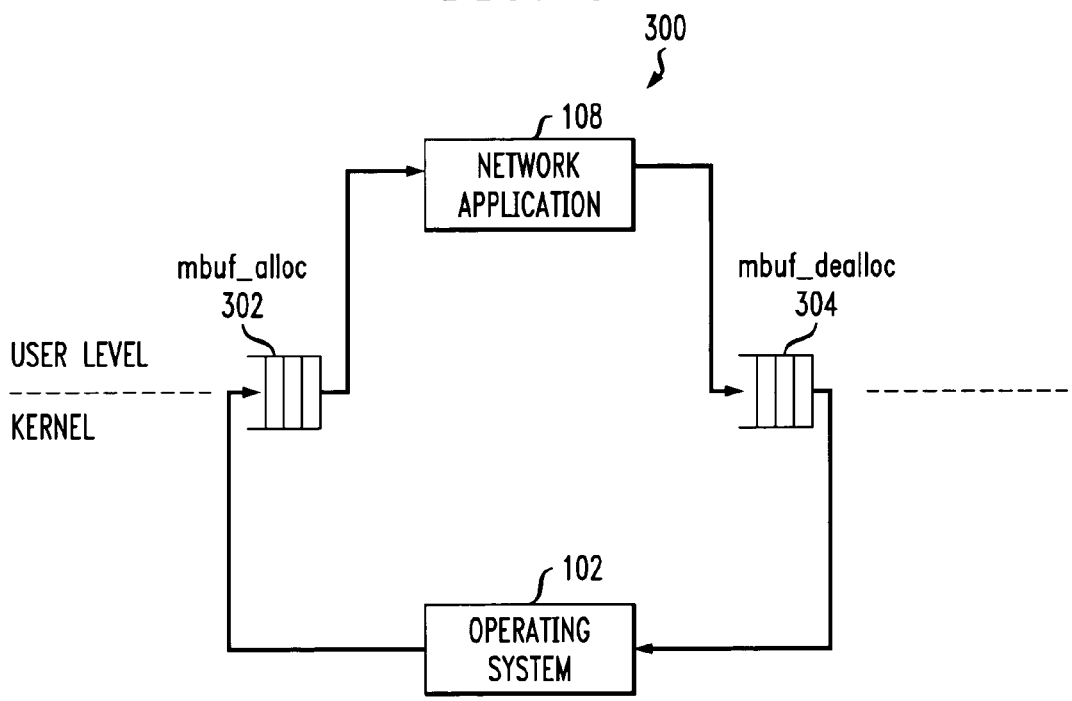
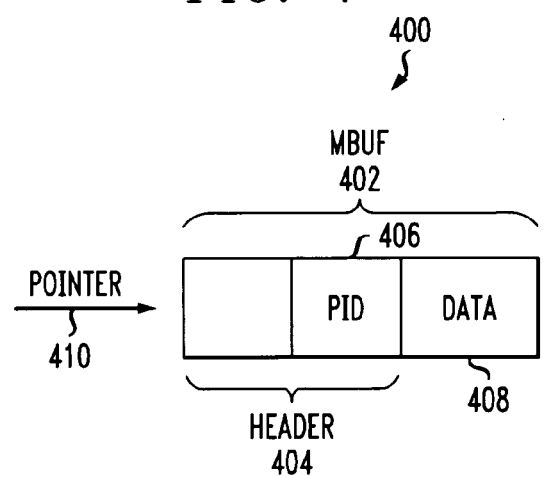

FIG. 7

| FIG. 7A |
|---|
| FIG. 7B |

FIG. 7A

```
define PERROR (msg) {perror(mag); exit (1);} define BUSY_WAIT_LIMIT 10 define CLASS_DENY 0
define CLASS_ACCEPT 1
define CLASS_HOST -1 int network_application(struct mbuf *m) {
... process packet and return its classification...
} void drop(struct cq *dealloc, struct mbuf *m) {
   if (cq_enqueue(dealloc, m) == 0) {
      mbuf_push(-1, 0);
      if (cq_enqueue(dealloc, m) == 0) {
         PERROR("Deallocating");
      }
   }
}
main () {
   int i, class, out, nempty, tin[2], tout[2];
   struct cq *alloc, *dealloc, *detour_r&[2],
      *revert_ip_in[2], *detour_ip_out[2], *revert_t&[2];
   char name[] = "fxp0";
   struct mbuf *m;
                                /* Map mbufs */
if (mbuf_map(*alloc, *dealloc, 0) !=0) {
      PERROR("Mapping mbufs");
   }
   for (i = 0; i < 2; i++) {    /* Tap interfaces */
      name[3] = (i == 0) ? '0' : '1';
      if ((sin[i] = interface_tap(name, *detour_rx[i],
                  *revert_ip_in[i], TAP_INPUT)) < 0) {
      PERROR("Tapping input");
```

FIG. 7B

```
    }
    if ((tout[i] = interface_tap(name, *detour_ip_out[i],
            *revert_tx[i], TAP_OUTPUT)) < 0) {
        PERROR("Tapping output")
      }
  }
  for (nempty = 0, i = 0; ; nempty++, i = (i + 1) * 1) {
    if ((m = cq_dequeue(detour_rx[r])) != 0) {/* Rr pkt */
      nempty = 0;
      if ((class = network_application(m)) ==
          CLASS_ACCEPT) {              /* Bridge pkt */
        out = cq_enqueue(revert_tx[(i + 1) & 1], m);
      } else if (class == CLASS_HOST) {  /* Host input */
        out = cq_enqueue(revert_ip_in[i], m);
      } else {
        out = 0;
      }
      if (!out) {  /* Drop if queue full or pkt denied */
        drop(dealloc, m);
      }
    }
    if ((m = cq_dequeue(detour_ip_out[1])) != 0) {
      nempty = 0;                       /* Host output */
      if (cq_enqueue(revert_tx[i],m) ==0) {  /* Tx pkt */
        drop(dealloc, m);         /* Drop if queue full */
      }
    }
    if (nempty == BUSY_WAIT_LIMIT) {
      mbuf_pull(0, 0);            /* Wait for pkt */
      nempty = 0;
    }
  }
}
```

APPLICATION PROGRAMMING INTERFACE FOR NETWORK APPLICATIONS

BACKGROUND OF THE INVENTION

1. Technical Field of the Invention

This invention generally relates to operating systems and, more particularly, to an apparatus and method for providing an application programming interface (API) for network applications.

2. Discussion of the Background Art

Broadly, Application Programming Interfaces (APIs) are those language and messaging formats that define how applications interact with an operating system, and with functions in other applications, communication systems, and hardware drivers. Network applications are those applications that, unlike host applications, process packets whose source and destination are network nodes different from that where the application runs. Network programming is the development of network applications.

Existing networks typically lack platforms that are well suited for network programming. Network hosts usually support only host applications. On the other hand, network bridges, switches, and routers usually execute fixed or configurable network applications and do not provide an API that would enable users to develop new applications.

Without network programming platforms, it can be difficult to prototype or realistically test many desirable new protocols or services. Several protocol enhancements can be demonstrated by analysis or simulation before, e.g., manufacturers implement them and include them among router configuration options. However, certain new services, such as billing (charging users for their network usage), may not be similarly amenable to analysis or simulation. Because the adequacy of a billing strategy depends on how users react to it, and such reaction is difficult to predict or model before observation, simulations may not be convincing. To test such new services, actual deployment and observation in the field are necessary.

Within the context of a network programming API implemented on a personal computer (PC) platform, several features are deemed to be desirable; namely (1) support for configuring the platform as a bridge, router or host; (2) general purpose functionality; (3) support for user-level applications; (4) the ability to pass packets between applications and the operating system without copying; and (5) reducing the number of system calls and interrupts generated per packet.

Unfortunately, existing PC operating systems do not provide APIs that meet all the above requirements. These and other disadvantages associated with the prior art are described in more detail in a paper authored by Blott et al. entitled "NetTap: An Efficient and Reliable PC-Based Platform for Network Programming" published on Mar. 26, 2000 in the Institute of Electrical and Electronic Engineers (IEEE) Proceedings of OPENARCH '2000.

SUMMARY OF THE INVENTION

An application programming interface (API) is described that allows creating or destroying one or more pairs of data structures for asynchronously passing between the operating system and a network application pointers to packet buffers mapped to both parties. A network application may use such a pair to: (1) input packets received from a specified network interface, and output packets to be processed by the operating system's network layer as received packets; (2) input packets output by the operating system's network layer to a specified network interface, and output packets to be actually sent by that interface; (3) input packets received and output packets to be sent by a specified network interface; or (4) input allocated and output deallocated packet buffers. The operating system automatically reclaims buffers allocated to a network application when the latter terminates. The API also allows a network application to sleep until the operating system inserts or removes a packet buffer pointer into or from one said data structure. The API may be used in systems configured as host, bridge, switch, or router.

An API according to an embodiment of the invention comprises first and second data structures associated with a network interface in communication with a network, the first and second data structures being mapped to an operating system and a network application, wherein: packets to be passed from the operating system to the network application are stored in a buffer and referenced via respective pointers within the first data structure, the first data structure pointers being inserted into the first data structure by the operating system prior to network layer processing, the first data structure pointers being removed by the network application, insertion and removal of the first data structure pointers being asynchronous with respect to each other; and packets to be processed as received packets by the network layer of the operating system are stored in a buffer and referenced via respective pointers within the second data structure, the second data structure pointers being inserted into the second data structure by the network application, the second data structure pointers being removed by said operating system, insertion and removal of the second data structure Dointers being asynchronous with respect to each other.

An API according to another embodiment of the invention for network applications, which applications can process packets whose source and destination nodes are nodes different from that where the application runs, the API comprising a primitive for creating a first and a second data structures associated with a specified network interface, if the data structures do not exist, and mapping the data structures both to the operating system and a specified network application, wherein the specified network interface receives and sends packets from and to a network, each packet is stored in a buffer mapped both to the operating system and the specified network application, the operating system inserts into and the specified network application may remove from the first data structure a pointer to each buffer containing a packet that the operating system's network layer outputs to the specified network interface, before the network interface sends the packets, the insertions and removals being asynchronous with respect to each other, and the specified network application may insert into and the operating system removes from the second data structure a pointer to each buffer containing a packet that the specified network interface sends to the network, the insertions and removals being asynchronous with respect to each other.

An API according to an embodiment of the invention for network applications, which applications can process packets whose source and destination nodes are nodes different from that where the application runs, the API comprising a primitive for creating a first and a second data structures associated with a specified network interface, if the data structures do not exist, and mapping the data structures both to the operating system and a specified network application, wherein the specified network interface receives and sends packets from and to a network and does not require a coprocessor, the specified network application requires supervisor privileges, every packet is stored in a buffer mapped both to the operating system and every network application, the operating system's network and higher protocol layers do not process any packets that the specified network interface receives or sends, the operating system inserts into and the specified network application may remove from the first data structure a pointer to each buffer containing a packet that the specified network interface receives from the network, the insertions and removals being asynchronous with respect to each other, and the specified network application may insert into and the operating system removes from the second data structure a pointer to each buffer containing a packet that the specified network interface sends to the network, the insertions and removals being asynchronous with respect to each other.

BRIEF DESCRIPTION OF THE DRAWINGS

The teachings of the present invention can be readily understood by considering the following detailed description in conjunction with the accompanying drawings, in which:

FIG. 2 depicts a program segment written in the C programming language including an API according to the invention;

FIG. 3 illustrates the data structures used for allocating and deallocating packets according to the invention;

FIG. 4 depicts an mbuf data structure useful in understanding the invention of FIG. 1;

FIG. 7 depicts an example of an application utilizing an API according to the invention.

To facilitate understanding, identical reference numerals have been used, wherever possible, to designate identical elements that are common to the figures.

DETAILED DESCRIPTION OF THE INVENTION

An illustrative embodiment (herein referred to as "NetTap") of a network programming API suitable for efficiently prototyping, field-testing, and deploying new network protocols and services is disclosed below. NetTap was implemented by the inventors on low-cost PC (Personal Computer) hardware and the freely available FreeBSD operating system. See, e.g., G. Lehey, The Complete FreeBSD, Walnut Creek CD ROM Books (2d ed. 1997), all relevant portions of which are herein incorporated by reference.

Like FreeBSD's network programming APIs, the NetTap API can be used by a system administrator. Unlike FreeBSD's APIs, however, the NetTap API supports the desirable features enumerated above for network programming APIs for PCs.

Various discussions associated with the prior art and information related to the present invention may be found in a paper by Blott et al. entitled "NetTap: An Efficient and Reliable PC-Based Platform for Network Programming" published on Mar. 26, 2000 in the Institute of Electrical and Electronic Engineers (IEEE) Proceedings of OPENARCH '2000, which paper is incorporated herein by reference in its entirety.

Figure 1:
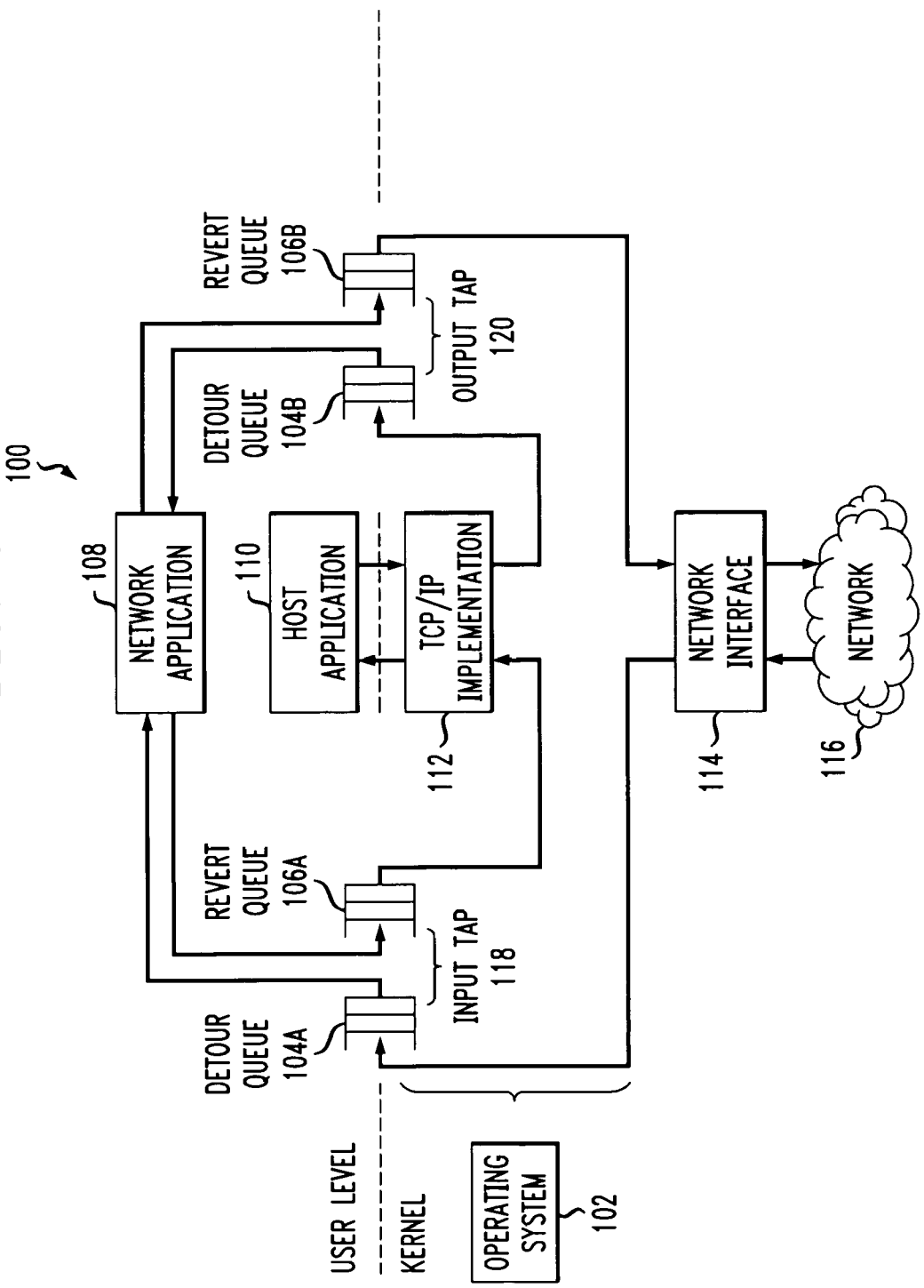
FIG. 1 depicts the organization of an application programming interface (API) according to the invention.

FIG. 1 depicts the organization of an application programming interface (API) according to the invention. Specifically, FIG. 1 illustrates data structure used for sending and receiving packets according to the invention. More specifically, FIG. 1 comprises a kernel level portion comprising a Transmission Control Protocol/Internet Protocol (TCP/IP) implementation 112 and a network interface 114 coupled to a network 116. An operating system 102 e.g., FreeBSD, operates at the kernel level and includes the NetTap API. A user level portion comprises a network application 108 and a host application 110. The host application 110 is coupled to the TCP/IP implementation 112 of the kernel level portion.

A circular queue comprises a first data structure and a second data structure. Specifically, first and second data structures comprise a detour and revert queue respectively which are mapped to both the operating system 102 and network application 108. More specifically, an input tap 118 comprises a detour queue 104A and a revert queue 106A. Detour queue 104A is coupled to the network interface 114 and network application 108. Revert queue 106A is coupled to network application 108 and TCP/IP implementation 112.

An output tap 120 comprises a detour queue 104B and a revert queue 106B. Detour queue 104B is coupled to TCP/IP implementation 112 and network application 108. Revert queue 106B is coupled to network application 108 and to the network interface 114.

It will be appreciated by those in the art that the invention can be practiced with a plurality of revert and detour queues. In addition the invention can also be practiced with a plurality of network interfaces and network applications.

The above mentioned queues can contain packet pointers 410 (See FIG. 4) which point to a location in memory where packets are stored. Specifically, the packet pointers 410 point to mbufs 402 (see FIG. 4) which comprise input buffers for storing received packets and output buffers for storing packets processed by the network application 108. Each mbuf 402, in the header 404, has a process identifier "pid" field 406. All mbufs 402 are assigned from a single unpageable region. Mbufs 402 will be described in more detail below with reference to FIG. 4.

It should be noted that network applications are those applications that, unlike host applications, process packets whose source and destination nodes are different from those where the application runs.

As incoming packets arrive, the packets are stored in memory. Data structures are created wherein pointers are placed in the data structures by the operating system 102. Specifically, pointers that point to the location of the incoming packets in memory are placed in detour queue 104A and taken out of detour queue 104A by the network application 108. After the network application 108 has processed a packet, the network application 108 can insert a pointer 410 to the packet buffer 402 in one of three queues. First, the network application 108 can insert the pointer 410 in revert queue 106A. In this case, the operating system's TCP/IP implementation processes the packet as received from the network 116. Second, the network application 108 can insert the pointer 410 in revert queue 106B. In this case, the network interface 114 sends the packet to the network 116. Third, the network application 108 can insert the pointer 410 in the mbuf_dealloc queue 304. In this case, the operating system deallocates the packet buffer 402.

The main characteristics of the NetTap API are: (i) all packet buffers are mapped both to the system and to network applications; (ii) instead of passing copies of packets to one another, system and network applications exchange pointers to packets; and (iii) system and network applications communicate asynchronously via a number of circular queues, thus avoiding system call overheads in normal cases. The system accesses queues asynchronously when a network interface interrupt occurs or returns, a NetTap system call returns, the system preempts or puts to sleep a NetTap application, or the system is idle. Because each queue contains only pointers that are enqueued by the system and dequeued by a network application, or vice-versa, there is no risk of conflict between system and application accesses. Therefore, system accesses do not have to be synchronized with respect to application accesses.

FIG. 2 depicts a program segment written in the C programming language including an API according to the invention. Specifically, program 200 is written in the C programming language and comprises a circular queue representation 202, inline functions for enqueueing 204 and dequeueing 206 a pointer to or from a circular queue, system calls including mbuf_map 208 mbuf_unmap 210, mbuff_pull 212, mbuf_push 214, interface_tap 216 and interface_untap 218. For a better understanding of the invention, program 200 should be read in view of FIG. 3 and FIG. 1 together.

In systems derived from BSD Unix (see M. McKusick, et al., the Design and Implementation of the 4.4 BSD Operating System, Addison-Wesley (1996), all relevant portions of which are herein incorporated by reference), including FreeBSD, network interfaces and protocols hold packets in buffers known as "mbufs", as illustrated in FIG. 4.

As previously discussed above with reference to FIG. 1, all mbufs 402 are allocated from a single unpageable region. NetTap's "mbuf_map" primitive 208 maps this region to the application's address space. Specifically, the primitive "mbuf_map" 208 creates two circular queues, "mbuf alloc" 302 and "mbuf_dealloc" 304, and maps them to the application's address space, as shown in FIG. 3. The "mbuf_unmap" primitive 210 unmaps the mbuf region and destroys the application's mbuf_alloc 302 and mbuf_dealloc 304 queues.

NetTap network applications 108 allocate mbufs by dequeueing the mbufs' pointers 410 from mbuf_alloc 302 using the dequeue routine 206, and deallocate mbufs by enqueueing the mbufs' pointers 410 in mbuf_dealloc 304 using the enqueue routine 204. The mbuf_map primitive 208 includes an argument, "mbuf_prealloc" (not shown), that specifies the minimum number of mbuf pointers 410 that should be enqueued in the application's mbuf_alloc queue 302. The operating system 102 asynchronously replenishes queue 302, making mbufs 402 available to the network application 108. When necessary (e.g., mbuf_alloc 302 is empty), however, applications 108 may use the mbuf_pull primitive 212 to force the system 102 to enqueue a specified (strictly positive) number of mbuf pointers 410 synchronously into mbuf_alloc 302, subject to a timeout interval specified in microseconds (infinite if set to 0). The system 102 asynchronously dequeues pointers 410 from the applications'108 mbuf_dealloc queues 304 and deallocates the respective mbufs. If necessary (e.g., mbuf_dealloc 304 is full), however, an application 108 may use the "mbuf_push" primitive 214, with the tap descriptor argument equal to −1, to force the system 102 to dequeue any pointers 410 from mbuf_dealloc 304 synchronously and deallocate the respective buffers. The primitives mbuf_map 208, mbuf_unmap 210, mbuf_push 212, and mbuf_pull 214 return 0 if successful, or an error code otherwise.

It will be appreciated by those skilled in the art that packets may have fixed or variable length. Although mbufs have a fixed length, a packet of any length can be stored in mbufs. Additionally, a plurality of mbufs can be concatenated to hold a packet that is larger than a single mbuf.

The "interface_tap" primitive 216 allows a NetTap application to open a tap on a specified network interface, as illustrated in FIG. 1. This function returns pointers to two queues: "detour" 104A or 104B, for passing packet pointers 410 from operating system 102 to the network application 108, and "revert" 106A or 106B, for passing packet pointers 410 from the network application 108 back to the operating system 102. After dequeueing a packet pointer 410 from detour 104A or 104B and processing the respective packet, the network application 108 may enqueue the packet pointer 410 in revert 106A or 106B. The detour and revert queues returned by interface_tap are called an input tap 118 or output tap 120 on the network interface 114.

If the interface_tap primitive's 216 "mode" argument is TAP_INPUT, the system 102 enqueues in detour 104A, instead of the regular IP input queue of the system's TCP/IP implementation 112, pointers 410 to packets received by the network interface 114 from the network 116. The system 102 dequeues packet pointers 410 from revert 106A and enqueues them in the regular IP input queue of the system's TCP/IP implementation 112, so that, e.g., a host application 110 may use the system's regular API (e.g., sockets) to receive packets destined to the host, and the system may firewall and forward packets destined to other hosts.

Conversely, if the interface_tap primitive's 216 mode is TAP_OUTPUT, a host application 110 may use the system's regular API to send packets, but the system enqueues in detour 104B packet pointers 410 that TCP/IP implementation 112 would normally pass to the network interface 114 for transmission to the network 116. The system 102 dequeues packet pointers 410 from revert 106B and passes them to the network interface 114 for transmission to the network 116.

Finally, if the interface_tap primitive's 216 mode is TAP_BYPASS, host applications 110 cannot use the system's regular API to send or receive packets via the network interface 114 and the system's firewalling and IP forwarding become inoperative on the network interface 114. The system 102 enqueues in detour 104A pointers 410 to packets received by the network interface 114 from the network 116, and dequeues packet pointers 410 from revert 106B and passes them to the network interface for transmission to the network 116. As shown in FIG. 1, a given network interface 114 can have both TAP_INPUT 118 and TAP_OUTPUT 120 taps. However, a given network interface 114 cannot have a TAP_INPUT 118 or TAP_OUTPUT 120 tap and also have a TAP BYPASS tap (not shown).

The interface_tap primitive 216 returns a tap descriptor, i.e., a file descriptor (small non-negative integer) that corresponds to the input tap 118 or output tap 120. The "interface_untap" primitive 218 reverts a previous interface_tap 216, and returns 0 if successful, or an error code otherwise. Between corresponding interface_tap 216 and interface_untap 218 calls, the respective tap 118 or 120 is said to be open by the application 108.

Network applications 108 input packets by dequeueing respective pointers 410 from a detour queue 104A or 104B, without system calls. If desired (e.g., detour 104A is empty), however, applications 108 may use the mbuf_pull primitive 212 (with a null number of mbufs) to wait for the system 102 to enqueue a packet pointer 410 in some detour queue 104A or 104B mapped to the application, subject to a specified timeout interval. While the application 108 waits for a packet, the system may run other applications or poll the network interfaces, thereby possibly reducing the number of interrupts.

Conversely, network applications 108 output packets by enqueueing in revert queues 106A or 106B pointers 410 to the mbufs containing the packets. The system 102 asynchronously dequeues mbuf pointers 410 from revert queues 106A and 106B and processes the respective packets (in the TAP_INPUT case, passes them to the IP input queue of the system's TCP/IP implementation 112; in the TAP_OUTPUT and TAP_BYPASS cases, passes them to the network interface 114 for transmission to the network 116). If necessary (e.g., a revert queue 106B is full), however, applications 108 may use the mbuf_push primitive 214 to wait for the system 102 to dequeue a specified number of pointers 410 from a specified revert queue 106A or 106B.

FIG. 4 depicts an mbuf data structure useful in understanding the invention of FIG. 1. Specifically, mbuf 402 comprises a header 404 field and a data 408 field. Included in the header field 404 is a process identifier field (pid) 406. Pointers 410 point to a respective mbuf 402.

NetTap prevents mbuf leakage as follows. Mbuf headers 404 gain a "pid" field 406 containing the identifier of the process that holds the mbuf 402 (if any). The system 102 updates an mbuf's pid field 406 whenever the system 102 enqueues the mbuf's pointer 410 in an application's mbuf_alloc queue 302 or in a tap's detour queue 104A or 104B. If multiple processes open the same tap, each process must update an mbuf's pid field 406 before dequeueing the mbuf's pointer 410 from detour 104A or 104B. When the system 102 dequeues an mbuf's pointer 410 from an mbuf_dealloc 304 or revert 106A or 106B queue, the system 102 clears the mbuf's pid field 406. Processes gain a flag indicating whether the process has mapped mbufs 402. When a process with such a flag set exits, the system 102 scans the mbuf region to find and deallocate mbufs 402 held by that process.

NetTap uses reference counting for maintaining an interface tap open while at least one process has that tap open. NetTap also keeps a list of taps open by each process. When a process exits, the system automatically untaps any taps that the process still has open.

Figure 5:
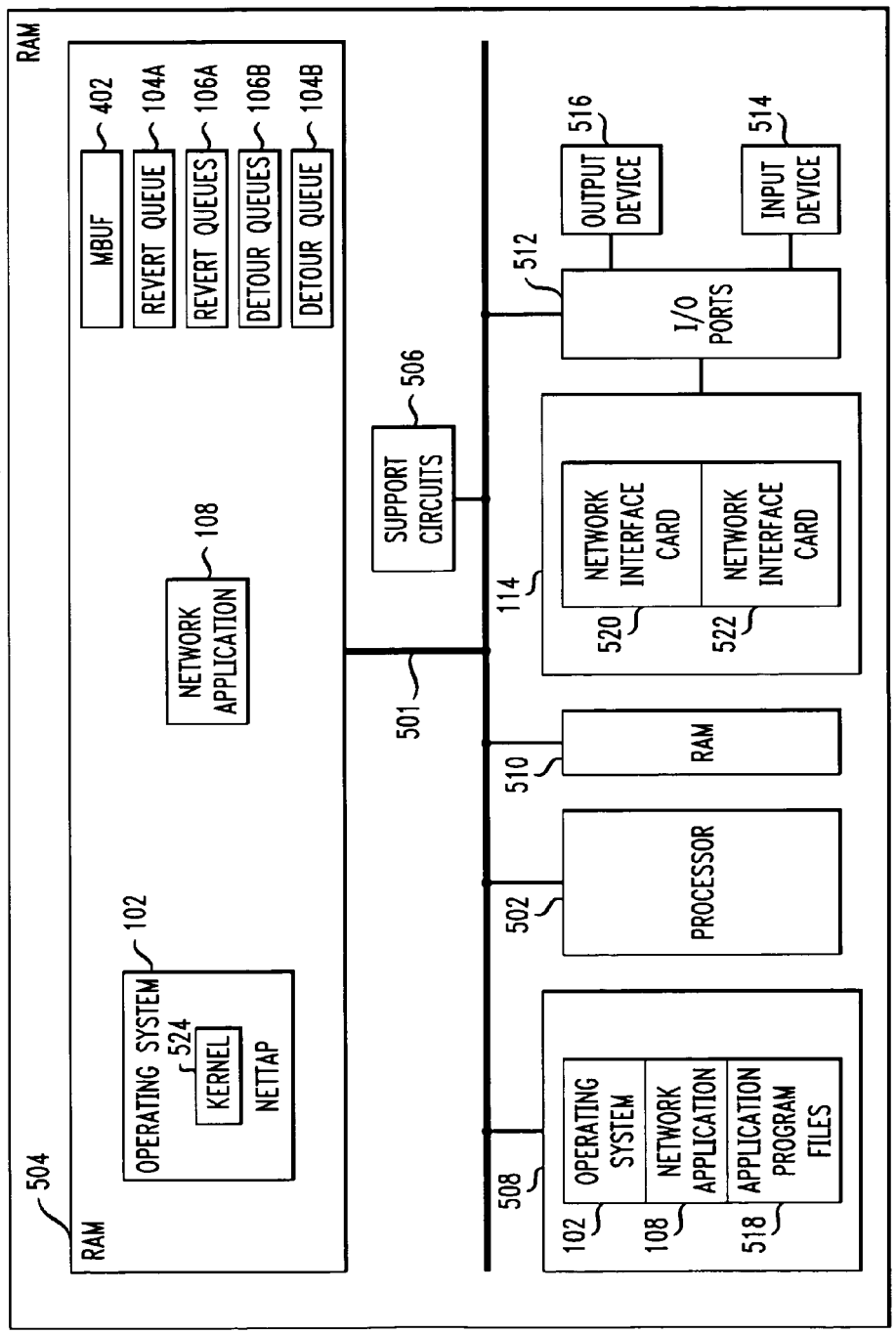
FIG. 5 depicts a block diagram of an illustrative embodiment of a computer system suitable for implementing the invention of FIG. 1.

FIG. 5 depicts a computer system 500 in accordance with the present invention. In this embodiment of the invention, the computer system 500 may be a desktop computer. However, a person skilled in the art will recognize that a laptop computer, server, hand-held device or the like may alternatively be utilized. The computer 500 comprises at least one system interconnect, e.g., bus 501 to which various components are coupled and communicate with each other. Specifically, a processor 502, storage device 508, memory such as random access memory (RAM) 504, read only memory (ROM) 510, input/output (I/O) ports 512, and other support circuits 506 are coupled to the system bus 501. Furthermore, one or more output devices 516, such as display, as well as one or more input devices 514 such as a keyboard and/or pointing device are respectively coupled to the I/O ports 512. In addition a the network interface 114 is also coupled to I/O port 512. The network interface 114 is illustratively shown as being coupled to a first network interface card 520; and a second network interface is connected to a second network interface card 522. The input and output devices 514 and 516 permit user interaction with the computer system 500 e.g., a system administrator in the preferred embodiment.

The processor 502 sends and receives information to and from each of the computer components coupled to the system bus 501 and performs system operations based upon the requirements of the computer system's operating system 102, the NetTap API and network application 108 programs that are installed thereon. The processor 502 may be an INTEL PENTIUM® type microprocessor or the like.

The ROM 510 typically includes a Basic Input-Output system (BIOS) program, which controls basic hardware operations such as the interaction of the microprocessor 502 with the keyboard/mouse of input device 514, the hard disk of storage device 508, or a video display of output devices 51G, and the like. The storage device 508 is a permanent storage medium such as a hard disk, CD-ROM. tape, or the like, which stores the operating system 102, the NetTap API, network application 108 and application program files 518.

The RAM 504 is volatile memory (e.g., SRAM, DRAM and the like). The contents of the RAM 504 may be retrieved from the storage device 508 as required. Illustratively, the RAM 504 is shown with the NetTap API, operating system 102 and network application 108 program concurrently operating.

It will be appreciated by those skilled in the art that although one network application is depicted, more than one network application can be depicted and be within the scope of the invention.

The NetTap API is sent to the RAM 504 for temporary storage and subsequent execution by the processor 502.

The I/O port 512 includes various controllers (not shown) for each input device 514 such as a keyboard, mouse, joystick, and the like, as well as the output devices 516 such as the plurality of network interface 114, adapter, infrared device (not shown) and display 516. Typically, other support circuits 506 include controllers for the storage device 508, floppy drive, graphics display, and the like (not shown).

The operating system 102 may be FreeBSD® or the like. FreeBSD is a stable operating system with mature protocol implementations, state of the art development tools, and a good track record for up to date peripheral support. The operating system is capable of interfacing with all of the hardware components of the computer 500.

In order to oversee the execution of all the files opened, a kernel 524 is stored in the RAM 504. The kernel 524 is installed at dedicated addresses in the RAM 504 and is responsible for memory management, process and task management, and disk management. The kernel 524 manages one or more files that are open during the course of operation.

The RAM 504 further comprises a portion of memory for storing detour queue queues 104A, 104B and revert queues 106A and 106B and mbuf 402 which comprises mbuf_alloc 302, mbuf dealloc 304.

Figure 6:
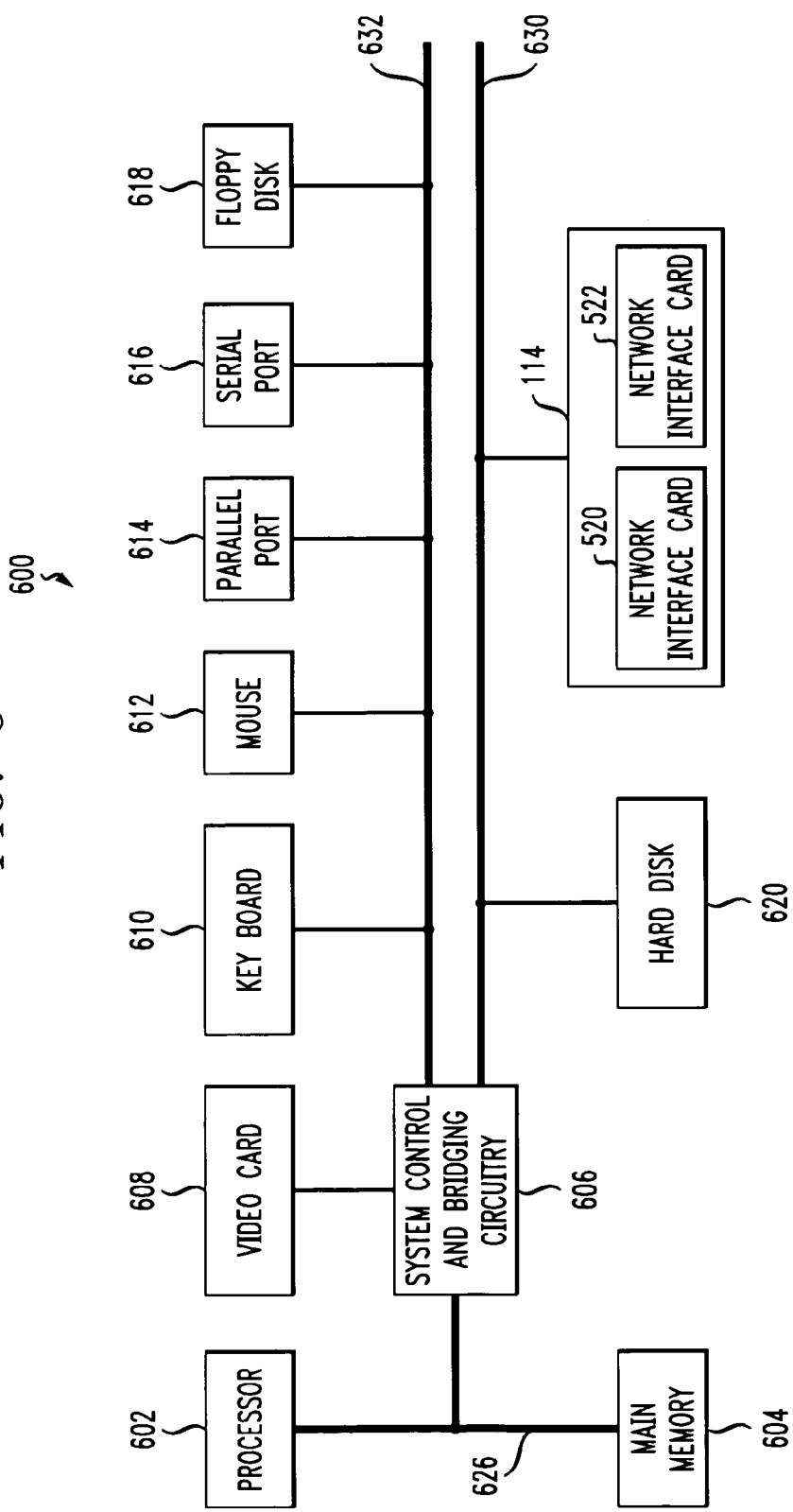
FIG. 6 depicts a block diagram of an illustrative alternate embodiment of a computer system suitable for implementing the invention of FIG. 1.

FIG. 6 depicts a block diagram of an illustrative alternate embodiment of a computer system suitable for implementing the invention of FIG. 1. Although in this embodiment of the invention, the computing system 600 is a personal computer (PC). However, a person skilled in the art will recognize that another type of computer or a network bridge, switch, or router may alternatively utilized. The components of system 600 include a processor 602, a main memory 604, a system control and bridging circuitry 606, a video card 608, a keyboard interface 610, a mouse 612, a parallel port 614, a serial port 616, a floppy disk controller 618, a hard disk controller 620, and the network interface 114 which illustratively is coupled to network interface card 520 or network interface card 522 is coupled to a different network interface. The processor 602, main memory 604, and system control and bridging circuitry 606 are connected by a memory bus 626. The system control and bridging circuitry 606 is also connected to: (1) the video controller 608 via video bus 628 (e.g., AGP); (2) other fast input/output (I/O) devices (e.g., the network interface card 114; illustratively depicted as being coupled to network interface cards 520 and 522) via a fast I/O bus 630 (e.g., PCI); and (3) slower I/O (e.g., keyboard 606) via a slow I/O bus 632 (e.g., ISA). The system control and bridging circuitry 606 and buses 620, 618, 630, and 632 provide the interconnections through which the various components communicate with each other.

The processor 602 may be, e.g., an Intel PENTIUM® microprocessor, and executes instructions from the operating system 102 and application 108 and programs 518. The operating system may be, e.g., FreeBSD, and incorporates the NetTap API. Network applications 108 use the NetTap API to send or receive packets. Programs and data are stored in main memory 604 while being processed. In particular, mbufs 402, mbuf_alloc queues 302, mbuf_dealloc queues 304, detour queues 104A, 104B, and revert queues 106A, 106B are stored in main memory 604. The processor 602 typically copies programs and initial data from hard disk 620 to main memory 604 during system or application initialization. The video 608, keyboard 610, and mouse 612 provide system interaction with a user, e.g. a system administrator. Network applications 108 must be executed by a system administrator. The network interface cards 520 and 522 transfer packets between the respective networks and mbufs in main memory 604. The network interface cards 520 and 522 may be controlled by processor 602 and need not have a coprocessor. The number of network interface cards in a system may vary from the two shown in FIG. 6.

It will be appreciated by those skilled in the art that NetTap applications can tap any number of network interfaces and therefore can implement host, bridge or router configurations. Moreover, NetTap applications 108 can be written in any language and implement arbitrary functionality.

FIG. 7 depicts an example of an application utilizing an API according to the invention within the context of a bridge configuration. In the bridge configuration, two instances of the API are utilized, one for each network interface. It should be noted that if no host applications 110 use a bridged network interface, then the program 700 can be considerably simplified by tapping interfaces in TAP_BYPASS mode.

Router or host configurations may need additional protocol support, provided, e.g., by user-level libraries for TCP/IP protocols, IP security, or output link scheduling. Such libraries can run on top of the NetTap API. Applications may easily specialize or modify user-level libraries. For example, applications such as NAT (network address translation) or LSNAT (load sharing using IP network address translation) might modify a user-level IP implementation.

NetTap applications 108 may run with real-time priority to obtain guaranteed performance regardless of other load (e.g., host applications) on the system. Real-time priorities are always greater than time-sharing priorities. FreeBSD has supported real-time priorities since version 3.0. NetTap applications 108 that need multiple threads of control may use POSIX (user-level) threads on top of a single real-time process, so as to avoid context switch overheads. Single-thread event-driven implementations can be expected to outperform multiple-thread implementations, however.

On the other hand, if a single processor 602 is unable to keep up with network traffic tapped by an application 108, it may be useful to run multiple instances of the application 108 on a shared-memory multiprocessor system, with one application instance per processor. Multiple applications 108 can map mbufs 402 and tap each one of the same plurality of network interface 114. In addition, mbuf_alloc 302 and mbuf_dealloc 304 queues are private to each application 108 currently being run. However, detour 104A and 104*b* and revert 106A and 106B queues are shared by all applications 108 that open the respective taps 118 or 120. Concurrent accesses to tapping queues or other shared data structures must be synchronized. Because NetTap is PC-based, synchronization can be achieved at user level, without system call overheads. The concurrent applications 108 can define a shared integer to be a lock that guards certain shared data structures. Each application 108 uses, for example, "i486" (or later) CPU's CMPXCHG (compare and exchange) instruction to acquire or release the lock respectively before or after accessing the shared data structures. The system 102 keeps a list of locks used by each application 108. When the application 108 exits, the system 102 automatically releases any locks still held by the application.

While the foregoing description represents preferred embodiments, it will be obvious to those skilled in the art that various changes and modifications may be made, without departing from the spirit and scope of the invention pointed out by the following claims:

What is claimed is:

1. An application programming interface (API) for network applications processing packets having source and destination nodes addresses different from a node where the application runs, said API stored in a computer readable medium, said API comprising:

first and second data structures associated with a network interface in communication with a network, said first and second data structures being mapped to an operating system and a network application, said network interface, operating system, and network application stored at a node capable of processing packets having source and destination node addresses different from said node where the application runs, wherein:

packets to be passed from the operating system to the network application are stored in a buffer and referenced via respective pointers within said first data structure, said respective pointers being exchanged between said operating system and said network application, said first data structure pointers being inserted into said first data structure by said operating system prior to network layer processing, said first data structure pointers being removed by said network application, insertion and removal of said first data structure pointers being asynchronous with respect to each other; and packets to be processed as received packets by said network layer of said operating system are stored in a buffer and referenced via respective pointers within said second data structure, said respective pointers being exchanged between said network application said operating system, said second data structure pointers being inserted into said second data structure by said network application, said second data structure pointers being removed by said operating system, insertion and removal of said second data structure pointers being asynchronous with respect to each other.

2. The API of claim 1, further comprising a primitive for creating said first and a second data structures if said first and a second data structures are not available.

3. The API of claim 1, further comprising a primitive for unmapping said first and a second data structures from the network application, said unmapping primitive operating to destroy said first and a second data structures if said data structures are mapped to no other network application.

4. The API of claim 3, wherein:
in the case of said first and a second data structures not being associated with the network interface, packets to be passed between the network and the network interface are processed by the operating system network layer.

5. The API of claim 1, wherein the operating system's network layer implements the internet Protocol (IP).

6. The API of claim 1, further comprising a primitive for creating said first and a second data structures mapped both to said operating system and said network application, wherein:
non-network packets to be passed from the operating system to the network application are stored in a buffer and referenced via respective pointers within said first data structure, said first data structure pointers being inserted into said first data structure by said operating system, said first data structure pointers being removed by said network application; and
non-network packets to be passed from said network application to said operating system are stored in a buffer and referenced via respective pointers within said second data structure, said second data structure pointers being inserted into said second data structure by said network application, said second data structure pointers being removed by said operating system.

7. The API of claim 6, wherein the operating system maintains in said first data structure at least a predefined number of pointers.

8. The API of claim 6, wherein the API further comprises a primitive to destroy said first and second data structures.

9. The API of claim 1 wherein other network applications are prevented from accessing a buffer from the time said network application removes a pointer to said buffer from said first data structure and inserts a pointer to said buffer into said second data structure.

10. The API of claim 9, wherein each buffer contains an identifier of any network application having exclusive use of the buffer.

11. The API of claim 10, wherein upon termination of a network application, the operating system automatically reclaims buffers that are in the application's exclusive use.

12. The API of claim 1 wherein said first or second data structure is a circular queue.

13. The API of claim 1, further comprising a primitive for placing the network application in a quiescent state until the operating system inserts a pointer into said first data structure.

14. The API of claim 1, further comprising a primitive for placing the network application in a quiescent state until the operating system removes a pointer from said second data structure.

15. The API of claim 1, wherein the node where the network application runs is configured as one of a host, a bridge, a switch and a router.

16. The API of claim 6 wherein other network applications are prevented from accessing a buffer from the time said network application removes a pointer to said buffer from said first data structure and inserts a pointer to said buffer into said second data structure.

17. An application programming interface (API) for network applications processing packets whose source and destination node addresses are nodes different from a node where the application runs, said API stored in a computer readable medium, said API comprising:
a primitive for creating a first and a second data structures associated with a specified network interface, if said data structures do not exist, and mapping said data structures both to the operating system and a specified network application, said network interface, operating system, and network application stored at a node capable of processing packets having source and destination node addresses different from said node where the application runs, wherein
the specified network interface receives and sends packets from and to a network,
each said packet is stored in a buffer mapped both to the operating system and the specified network application,
the operating system inserts into and the specified network application removes from said first data structure, a pointer to each buffer containing a packet that the operating system's network layer outputs to the specified network interface, before the network interface sends said packets, said insertions and removals being asynchronous with respect to each other, and
the specified network application inserts into and the operating system removes from said second data structure, a pointer to each buffer containing a packet that the specified network interface sends to the network, said insertions and removals being asynchronous with respect to each other.

18. The API of claim 17, wherein the API further comprises a primitive for unmapping said data structures from the specified network application and, if said data structures are mapped to no other network application, destroying said data structures.

19. An application programming interface (API) for network applications processing packets whose source and destination node addresses are nodes different from a node where the application runs, said API stored in a computer readable medium, said API comprising:
a primitive for creating a first and a second data structures associated with a specified network interface, if said data structures do not exist, and mapping said data structures both to the operating system and a specified network application, said network interface, operating system, and network application stored at a node capable of processing packets having source and destination node addresses different from said node where the application runs, wherein
the specified network interface receives and sends packets from and to a network and does not require a coprocessor,
the specified network application requires supervisor privileges,
every packet is stored in a buffer mapped both to the operating system and every network application,
the operating system's network and higher protocol layers do not process any packets that the specified network interface receives or sends, the operating system inserts into and the specified network application removes from said first data structure, a pointer to each buffer containing a packet that the specified network interface receives from the network, said insertions and removals being asynchronous with respect to each other, and the specified network application inserts into and the operating system removes from said second data structure, a pointer to each buffer containing a packet that the specified network interface sends to the network, said insertions and removals being asynchronous with respect to each other.

20. The API of claim 19, wherein the API further comprises a primitive for unmapping said data structures from the specified network application and, if said data structures are mapped to no other network application, destroying said data structures.

* * * * *